(12) United States Patent
Dai et al.

(10) Patent No.: US 11,669,690 B2
(45) Date of Patent: Jun. 6, 2023

(54) METHOD AND APPARATUS FOR PROCESSING SEMATIC DESCRIPTION OF TEXT ENTITY, AND STORAGE MEDIUM

(71) Applicant: BEIJING BAIDU NETCOM SCIENCE AND TECHNOLOGY CO., LTD., Beijing (CN)

(72) Inventors: Songtai Dai, Beijing (CN); Xinwei Feng, Beijing (CN); Miao Yu, Beijing (CN); Huanyu Zhou, Beijing (CN); Xunchao Song, Beijing (CN); Pengcheng Yuan, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 177 days.

(21) Appl. No.: 17/149,226

(22) Filed: Jan. 14, 2021

(65) Prior Publication Data
US 2021/0216722 A1    Jul. 15, 2021

(30) Foreign Application Priority Data

Jan. 15, 2020    (CN) .......................... 202010041592.7

(51) Int. Cl.
*G06F 17/00*        (2019.01)
*G06F 40/30*        (2020.01)
(Continued)

(52) U.S. Cl.
CPC .............. *G06F 40/30* (2020.01); *G06F 16/35* (2019.01); *G06F 40/295* (2020.01)

(58) Field of Classification Search
None
See application file for complete search history.

(56) References Cited

U.S. PATENT DOCUMENTS 10,643,120 B2 * 5/2020 Fauceglia ............ G06N 3/0454
2008/0208864 A1   8/2008 Cucerzan et al.
(Continued)

FOREIGN PATENT DOCUMENTS

CN    108280061 A    7/2018
CN    108829669 A    11/2018
(Continued)

OTHER PUBLICATIONS

Masahiro Ishikawa, "An Experimental Result on Visualization of Word Sense Changes by Blog Text Analysis", Blog Text Analysis, Mar. 4, 2018, pp. 27-33.
(Continued)

*Primary Examiner* — Satwant K Singh
(74) *Attorney, Agent, or Firm* — Bridgeway IP Law Group, PLLC; Jihun Kim

(57) ABSTRACT

A method for processing a sematic description of a text entity is proposed. The method includes: acquiring a plurality of target texts containing a main entity, and extracting related entities describing the main entity from each target text; acquiring a sub-relation vector of a pair of the main entity and each related entity in each target text; calculating a similarity distance of the main entity between different target texts based on the sub-relation vector; and determining a semantic similarity of the main entity descripted in different target texts based on the similarity distance.

9 Claims, 3 Drawing Sheets

(51) Int. Cl.
*G06F 16/35* (2019.01)
*G06F 40/295* (2020.01)

(56) References Cited

U.S. PATENT DOCUMENTS

| | | | |
|---|---|---|---|
| 2016/0189047 A1 | 6/2016 | Meij et al. | |
| 2019/0220749 A1* | 7/2019 | Feng | G06N 3/088 |
| 2020/0234102 A1* | 7/2020 | Fauceglia | G06N 3/0445 |

FOREIGN PATENT DOCUMENTS

| | | |
|---|---|---|
| CN | 109582967 A | 4/2019 |
| CN | 109933785 A | 6/2019 |
| CN | 110188168 A | 8/2019 |
| CN | 110245342 A | 9/2019 |
| CN | 110287312 A | 9/2019 |
| EP | 3514702 A1 | 7/2019 |
| JP | 2004246491 A | 9/2004 |

OTHER PUBLICATIONS

Komiya Shinji, "Office Action for JP Application No. 2021-005300", dated Mar. 29, 2022, JPO, Japan.
Laurence Lechenne, "Search Report for EP Application No. 21151567.1", dated Jun. 11, 2021, EPO. Germany.
Yamin Sun, "Representation learning for entity disambiguation", Dissertation for the Doctoral Degree in Engineering, Dec. 2017.
Masumi Shirakawa et al., "Wikipedia-Based Semantic Similarity Measurements for Noisy Short Texts Using Extended Naive Bayes", Computer Science IEEE, Mar. 31, 2015.
Li Zhiyuan, "Office Action for CN application 202010041592.7", dated Feb. 21, 2023, CNIPA, China.

\* cited by examiner

METHOD AND APPARATUS FOR PROCESSING SEMATIC DESCRIPTION OF TEXT ENTITY, AND STORAGE MEDIUM

CROSS-REFERENCE TO RELATED APPLICATION

The present application is based upon and claims priority to Chinese Patent Application No. 202010041592.7, filed on Jan. 15, 2020, the entirety contents of which are incorporated herein by reference.

TECHNICAL FIELD

The present disclosure relates to a field of computer technologies, specifically to a field of knowledge graph technology, and proposes a method and apparatus for processing a sematic description of a text entity, and a storage medium.

BACKGROUND

Text similarity is widely used in fields such as natural language processing, knowledge graphs, and so on. There are currently a variety of solutions to determine text similarity. For example, text similarity can be calculated through language models.

In view of the above scenarios, a solution that can determine whether the semantic descriptions of an entity in different texts are similar is needed.

SUMMARY

Embodiments of the present disclosure propose a semantic description processing method for text entities. The method includes: acquiring a plurality of target texts containing a main entity, and extracting related entities describing the main entity from each target text; acquiring a sub-relation vector of a pair of the main entity and each related entity in each target text; calculating a similarity distance of the main entity between different target texts based on the sub-relation vector; and determining a semantic similarity of the main entity descripted in different target texts based on the similarity distance.

Embodiments of the present disclosure propose a semantic description processing apparatus for text entities. The apparatus includes: a non-transitory computer-readable medium including computer-executable instructions stored thereon, and an instruction execution system which is configured by the instructions to implement: an extracting module, configured to acquire a plurality of target texts containing a main entity, and extract related entities describing the main entity from each target text; an acquiring module, configured to acquire a sub-relation vector of a pair of the main entity and each related entity in each target text; a generating module, configured to calculate a similarity distance of the main entity between different target texts based on the sub-relation vector; and a determining module, configured to determine a semantic similarity of the main entity descripted in different target texts based on the similarity distance.

Embodiments of the present disclosure propose a non-transitory computer-readable storage medium storing computer instructions, when the computer instructions are executed, the computer is caused to implement the method according to the present disclosure. The method includes: acquiring a plurality of target texts containing a main entity, and extracting related entities describing the main entity from each target text; acquiring a sub-relation vector of a pair of the main entity and each related entity in each target text; calculating a similarity distance of the main entity between different target texts based on the sub-relation vector; and determining a semantic similarity of the main entity descripted in different target texts based on the similarity distance.

Other effects of the above-mentioned optional manners will be described below in conjunction with specific embodiments.

BRIEF DESCRIPTION OF THE DRAWINGS

The accompanying drawings are used to better understand the solution, and do not constitute a limitation on the disclosure, in which.

DETAILED DESCRIPTION

The following describes exemplary embodiments of the present disclosure with reference to the accompanying drawings, which include various details of the embodiments of the present disclosure to facilitate understanding, and should be regarded as merely exemplary. Therefore, those of ordinary skill in the art should realize that various changes and modifications can be made to the embodiments described herein without departing from the scope and spirit of the present disclosure. Likewise, for clarity and conciseness, descriptions of well-known functions and structures are omitted in the following description.

Embodiments in the above disclosure have following advantages or beneficial effects. The solution includes acquiring a plurality of target texts containing a main entity, and extracting related entities describing the main entity from each target text; acquiring a sub-relation vector of a pair of the main entity and each related entity in each target text; calculating a similarity distance of the main entity between different target texts based on the sub-relation vector; and determining a semantic similarity of the main entity descripted in different target texts based on the similarity distance. Therefore, by determining the semantic similarity of entity descriptions in different texts, it is possible to compare the description information related to specific entities in different texts, while ignoring other irrelevant entities, so as to accurately determine whether the descriptions of the same entity in different texts are similar. It can be applied to scenarios such as multi-article verification of intelligent question answering and encyclopedia entry classification.

Figure 1:
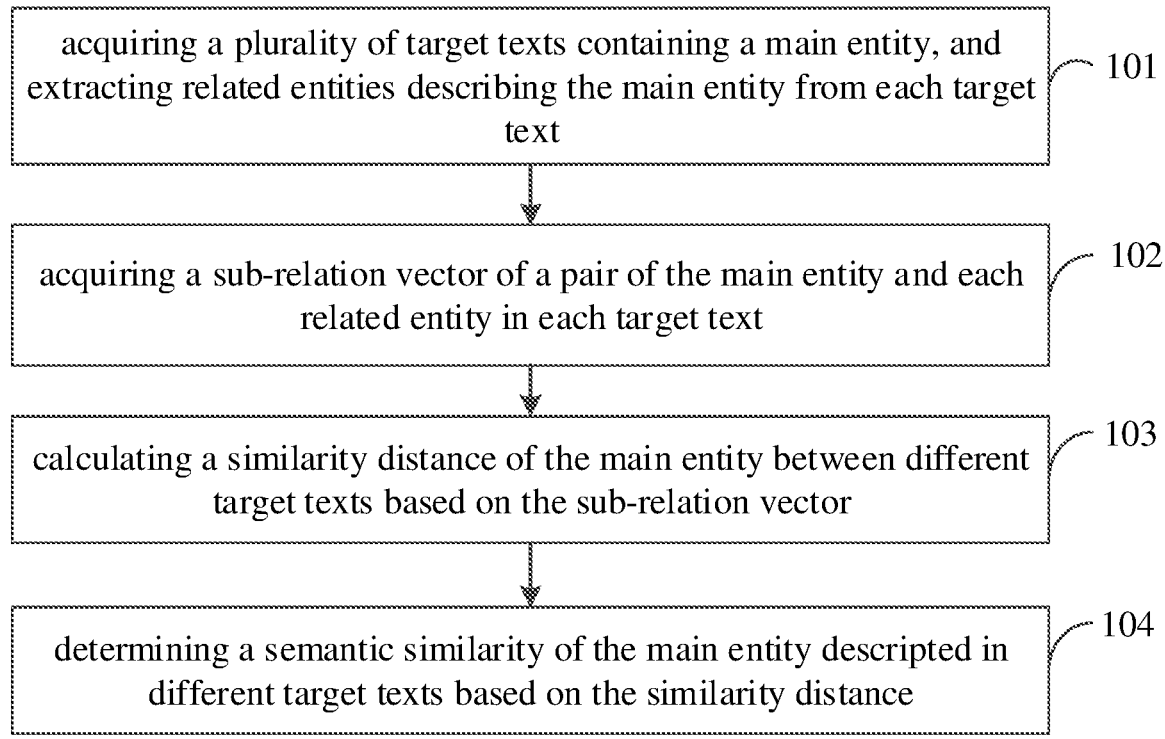
FIG. 1 is a flowchart of a method for processing a sematic description of a text entity according to an embodiment of the present disclosure.

FIG. 1 is a schematic flowchart of a method for processing a sematic description of a text entity provided by an embodiment of the disclosure. As shown in FIG. 1, the method includes followings.

At step 101: a plurality of target texts containing a main entity are acquired, and related entities describing the main entity are extracted from each target text.

In practical disclosures, there are scenarios where it is necessary to determine whether the description of an entity in two texts is the same or similar. For example, for two texts that both contain an entity: a character XXX (a person's name), it is necessary to determine the semantic similarity of the descriptions of the entity in the two texts to further determine whether the two texts describe the same person.

In this embodiment, when determining the semantic relation between main entities in multiple texts, multiple target texts containing the main entity can be acquired, and other related entities describing the main entity can be extracted from each target text.

As an example, multiple target texts containing the main entity can be acquired, and then an entity set can be acquired through a related named entity recognition method. The entity set includes the main entity and other entities in the target text, and the identified other entities are used as other related entities for describing the main entity.

As another example, named entities may be recognized for each target text to acquire a candidate entity set. Furthermore, candidate entities whose distance from the main entity in the target text is less than a preset distance are acquired from the candidate entity set, and the candidate entities are determined as the related entities describing the main entity.

At step 102, a sub-relation vector of a pair of the main entity and each related entity in each target text is acquired.

In this embodiment, for each target text, the sub-relation vector between the main entity and each related entity can be acquired. For example, the main entity is A, the related entities include B and C, and the sub-relation between A and B and the sub-relation between B and C are acquired. There are many ways to acquire the sub-relation vector.

In an embodiment of the present disclosure, the first vector representation of each word in the target text is acquired, and then the first vector representation, the main entity and each related entity are weighted according to a pre-trained conversion model, and a second vector representation of a text content associated with the main entity and each related entity in the target text may be acquired. A pooling process is performed on the second vector representation to generate the sub-relation vector of the pair of the main entity and each related entity.

In an embodiment of the present disclosure, the target text, the main entity and each related entity are processed based on a pre-trained relation extraction model, and a probability distribution of a relation between the main entity and each related entity is acquired. Further, a mapping is performed on the probability distribution based on a pre-trained mapping model, and the sub-relation vector of the pair of the main entity and each related entity is acquired.

At step 103, a similarity distance of the main entity between different target texts is calculated based on the sub-relation vector.

In an embodiment of the present disclosure, a summation is performed on the sub-relation vector of the pair of the main entity and each related entity pair in each target text, and a main relation vector corresponding to the main entity in each target text is calculated. Further, the similarity distance of the main entity between different target texts may be calculated based on the main relation vector.

As an example, the sub-relation vector 1 between the main entity A and the related entity B, and the sub-relation vector 2 between the main entity A and the related entity C are acquired. The main relation vector corresponding to the main entity is acquired by summing the sub-relation vectors 1 and 2. Further, for each target text, the main relation vector corresponding to the main entity is acquired, and the similarity is calculated based on the main relation vector, thereby determining the similarity distance of the main entity between different target texts. Implementations of similarity calculation can be selected according to needs, which is not limited herein.

At step 104, a semantic similarity of the main entity descripted in different target texts is determined based on the similarity distance.

In this embodiment, the semantic similarity of the description of the main entity in different target texts can be determined according to the similarity distance. For example, the smaller the similarity distance is, the closer the semantics of the description of the main entity in the two texts.

According to the method of the present disclosure, the solution includes acquiring a plurality of target texts containing a main entity, and extracting related entities describing the main entity from each target text; acquiring a sub-relation vector of a pair of the main entity and each related entity in each target text; calculating a similarity distance of the main entity between different target texts based on the sub-relation vector; and determining a semantic similarity of the main entity descripted in different target texts based on the similarity distance. Therefore, by determining the semantic similarity of entity descriptions in different texts, it is possible to compare the description information related to specific entities in different texts, while ignoring other irrelevant entities, so as to accurately determine whether the descriptions of the same entity in different texts are similar. It can be applied to scenarios such as multi-article verification of intelligent question answering and encyclopedia entry classification.

Based on the foregoing embodiments, it will be described below how to acquire the main relation vector based on the sub-relation vector.

Figure 2:
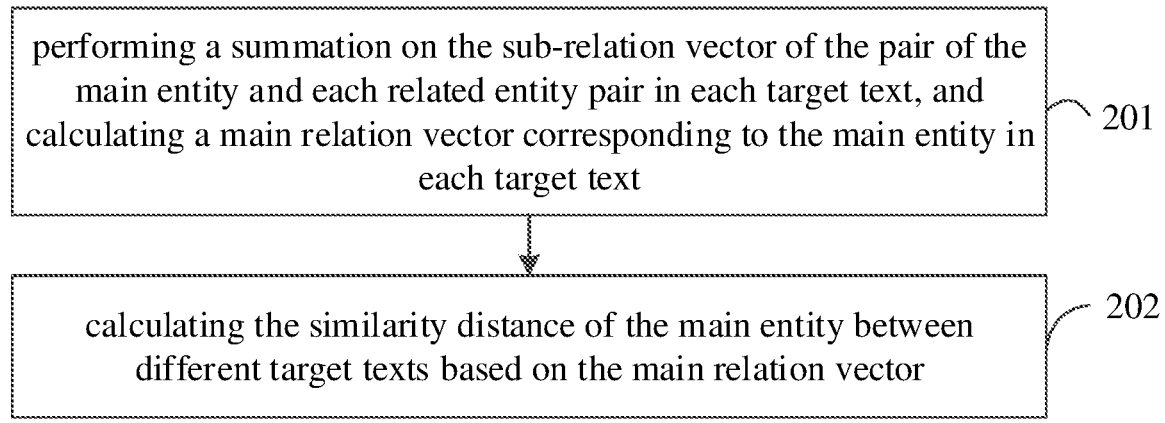
FIG. 2 is a flowchart of a method for processing a sematic description of a text entity according to another embodiment of the present disclosure.

FIG. 2 is a flowchart of a method for processing a sematic description of a text entity according to another embodiment of the present disclosure. As shown in FIG. 2, the method includes followings.

At step 201, a summation is performed on the sub-relation vector of the pair of the main entity and each related entity pair in each target text, and a main relation vector corresponding to the main entity in each target text is calculated.

In an embodiment of the present disclosure, an entity description model can be pre-trained. The input of the entity description model is the sub-relation vector and the output is the main relation vector. By acquiring a sample text set containing a preset entity, in which it is marked in the sample text set whether the preset entities are similar, and the sub-relation vector between the preset entity and the related entity is acquired according to the sample text set, and then the sub-relation vector is input into the preset model for processing to generate the main relation vector, and further the similarity prediction result of the preset entity description may be acquired according to the main relation vector, and the processing parameters of the preset model may be trained through backpropagation according to the prediction result and the annotation result to determine the entity description model. The preset model can be realized by graph attention neural network.

In this embodiment, after acquiring multiple sub-relation vectors of pairs of the main entity and related entities in each target text, the multiple sub-relation vectors are input into the pre-trained entity description model for weighting processing to acquire the main relation vector corresponding to the main entity in the target text.

At step 202, the similarity distance of the main entity between different target texts is calculated based on the main relation vector.

As an example, the first text and the second text are acquired, and both the first text and the second text include the main entity. Furthermore, N related entities corresponding to the main entity in the first text are determined, N sub-relation vectors are acquired, and further, the main relation vector 1 corresponding to the main entity is calculated according to the N sub-relation vectors. For the second text, M related entities corresponding to the main entity are determined, and M sub-relation vectors are acquired, and further, the main relation vector 2 corresponding to the main entity is calculated according to the M sub-relation vectors. The similarity is calculated through the main relation vectors 1 and 2, and the similarity distance of the main entity between different target texts is determined.

According to the method of embodiments of the present disclosure, the solution includes performing a summation on the sub-relation vector of the pair of the main entity and each related entity pair in each target text, and calculating a main relation vector corresponding to the main entity in each target text; and calculating the similarity distance of the main entity between different target texts based on the main relation vector. Furthermore, according to the main relation vector corresponding to the main entity in each target text, the similarity distance of the main entity between different target texts is calculated. As a result, the main relation vector describing the main entity is acquired, so as to further improve the accuracy of the semantic similarity calculation of the main entity descripted in different target texts.

The following describes an implementation manner of acquiring the sub-relation vector of a pair of the main entity and each related entity.

Figure 3:
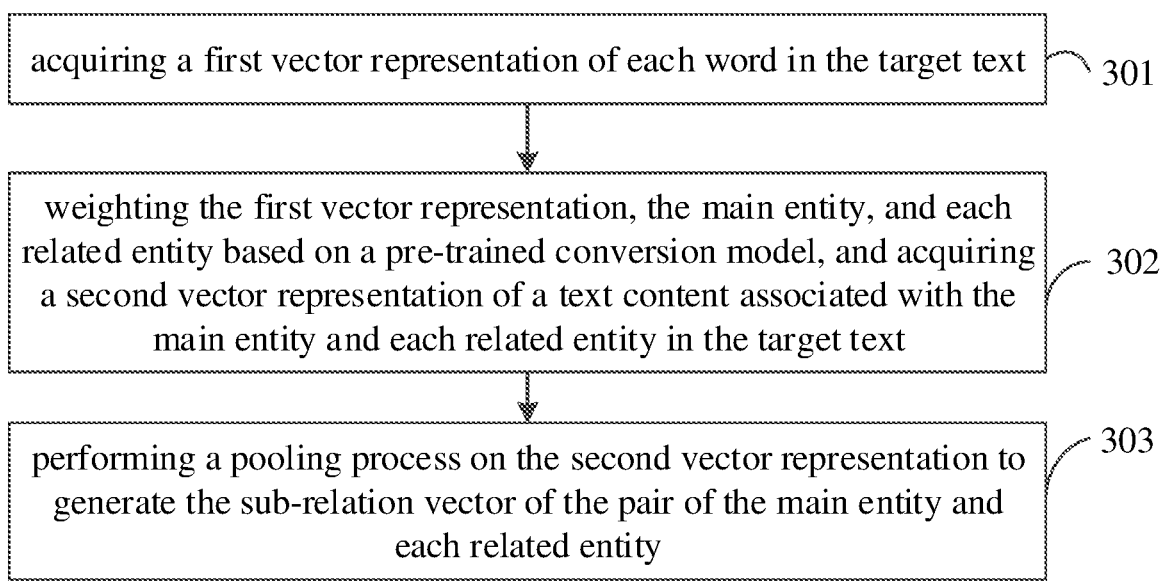
FIG. 3 is a flowchart of a method for processing a sematic description of a text entity according to yet another embodiment of the present disclosure.

FIG. 3 is a flowchart of a method for processing a sematic description of a text entity according to yet another embodiment of the present disclosure. As shown in FIG. 3, the method includes followings.

At step 301, a first vector representation of each word in the target text is acquired.

As a possible implementation manner, the target text can be processed through the language model to acquire the vector representation of each word in the target text as the first vector representation. The language models include but are not limited to the BERT model (Bidirectional Encoder Representations from Transformers), ERNIE (Knowledge Enhanced Semantic Representation Model, Enhanced Representation from kNowledge IntEgration), etc.

At step 302, the first vector representation, the main entity, and each related entity are weighted based on a pre-trained conversion model, and a second vector representation of a text content associated with the main entity and each related entity in the target text is acquired.

In an embodiment of the present disclosure, a sample text set can be acquired, the sample text set indicates whether the relations among the preset entity pairs are similar. Further, the sample text set is input into the preset model for processing, the similarity prediction result of the preset entity to the relation is acquired, and the processing parameters of the preset model are trained according to the similarity prediction result and the annotation result to determine the conversion model.

As an example, the preset model may include a transformer structure, a pooling layer, and a similarity calculation part. For the first text and the second text in the sample text set, the sample text includes preset entities A and B, and it is marked whether the relations between the preset entity A and B are similar in the two texts. The first text is input into the language model to acquire the vector representation of each word in the first text. The preset entity pair and the vector representation of each word are input into the input transformer structure for weighting processing, and then the weighted vector representation are input into the pooling layer for pooling processing, so as to acquire the sub-relation vector of the preset entity pair in the first text. The sub-relation vector of the preset entity pair in the second text is acquired with reference to the first text. Further, the similarity calculation is performed according to the sub-relation vector of the preset entity pair in the first text and the second text to determine the similarity prediction result of the semantic relation of the preset entity pair. According to the prediction result and the annotation result, the processing parameters of the transformer structure are adjusted by backpropagation until the prediction result matches the marked result, and the conversion model is determined through training.

In this embodiment, an entity pair is formed by the main entity and each related entity in the target text, and then the first vector representation and the entity pair are processed according to the pre-trained conversion model, and a second vector representation of a related text content in the target text for the main entity and each related entity.

At step 303, a pooling process is performed on the second vector representation to generate the sub-relation vector of the pair of the main entity and each related entity.

As an example, for the second vector representation of N×M matrix (N words, M dimensions), an average value of the m-th dimension of each word is calculated. By averaging each dimension, a sub-relation vector in the form of 1×M is generated.

It should be noted that the above method of pooling is only an example. For example, it can also be achieved by taking the maximum value/minimum value for each dimension, which is not limited here.

The method for processing a sematic description of the text entity in the embodiment of the present disclosure processes the target text, the main entity and each related entity through the pre-trained conversion model and the pooling layer, and generates the sub-relation vector of the pair of the main entity and each related entity, to acquire the vector representation of the relation between the entity pairs.

The following describes another implementation manner of acquiring the sub-relation vector of the pair of the main entity and each related entity.

Figure 4:
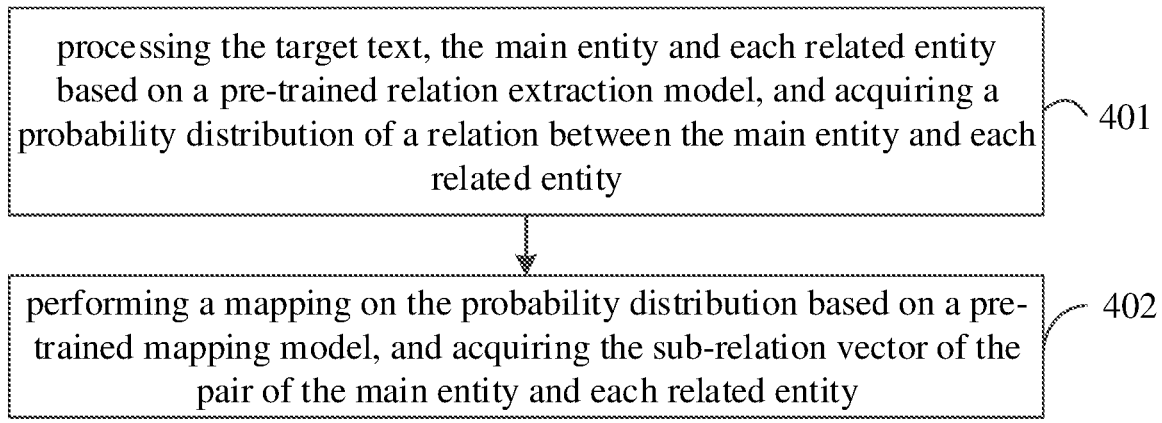
FIG. 4 is a flowchart of a method for processing a sematic description of a text entity according to still another embodiment of the present disclosure.

FIG. 4 is a flowchart of a method for processing a sematic description of a text entity according to still another embodiment of the present disclosure. As shown in FIG. 4, the method includes followings.

At step 401, the target text, the main entity and each related entity are processed based on a pre-trained relation extraction model, and a probability distribution of a relation between the main entity and each related entity is acquired.

In this embodiment, the target text, the main entity and each related entity are processed according to the pre-trained relation extraction model, and the probability distribution of the relation between the main entity and each related entity is acquired. For example, the main entity includes entity A, and the related entities include entities B and C. The probability distribution [0.6, 0.2, 0.2] of the relation between A and B is acquired, and the probability distribution [0.2, 0.7, 0.1] of the relation between A and C is acquired. The relation extraction model may be trained with a method according to needs, which will not be described herein.

In step 402, a mapping is performed on the probability distribution based on a pre-trained mapping model, and the sub-relation vector of the pair of the main entity and each related entity is acquired.

In an embodiment of the present disclosure, a sample text set can be acquired, and the sample text set indicates whether the relations between the preset entity pairs are similar. Furthermore, the sample text set is input into the preset model for processing, the similarity prediction result of the preset entity to the relation is acquired, and the processing parameters of the preset model are trained according to the prediction result and the annotation result to determine the mapping model. Optionally, the mapping model can be implemented through a fully connected layer.

As an example, the preset model includes a relation extraction model and a fully connected layer. For the first text and the second text in the sample text set, the sample text includes preset entities A and B, it is marked whether the relations between the preset entities A and B in the two texts are similar, and the first text and the preset entity pair are input into the relation extraction model to acquire the probability distribution of the relation of the preset entity pair in the first text, and inputs it to the fully connected layer according to the probability distribution to generate the sub-relation vector of the preset entity pair in the first text. Further, the similarity calculation is performed according to the sub-relation vector of the preset entity pair in the first text and the second text to determine the similarity prediction result of the relation of the preset entity pair. The processing parameters of the fully connected layer are adjusted through backpropagation according to the prediction result and the marked result, until the prediction result matches the marked result, and the mapping model is determined through training.

In this embodiment, the probability distribution is processed according to the pre-trained mapping model, and the sub-relation vector of the pair of the main entity and each related entity is acquired. For example, for the probability distribution [0.6, 0.2, 0.2] of the relation between A and B, and the probability distribution [0.2, 0.7, 0.1] of the relation between A and C, sub-relation vector 1 and sub-relation vector 2 are acquired respectively.

According to the method of the present disclosure, by processing the target text, the main entity and each related entity based on a pre-trained relation extraction model, and acquiring a probability distribution of a relation between the main entity and each related entity; and performing a mapping on the probability distribution based on a pre-trained mapping model, and acquiring the sub-relation vector of the pair of the main entity and each related entity, a vector representation of the relation between entity pairs may be acquired.

In order to implement the above embodiments, the present disclosure also proposes an apparatus for processing a sematic description of a text entity.

Figure 5:
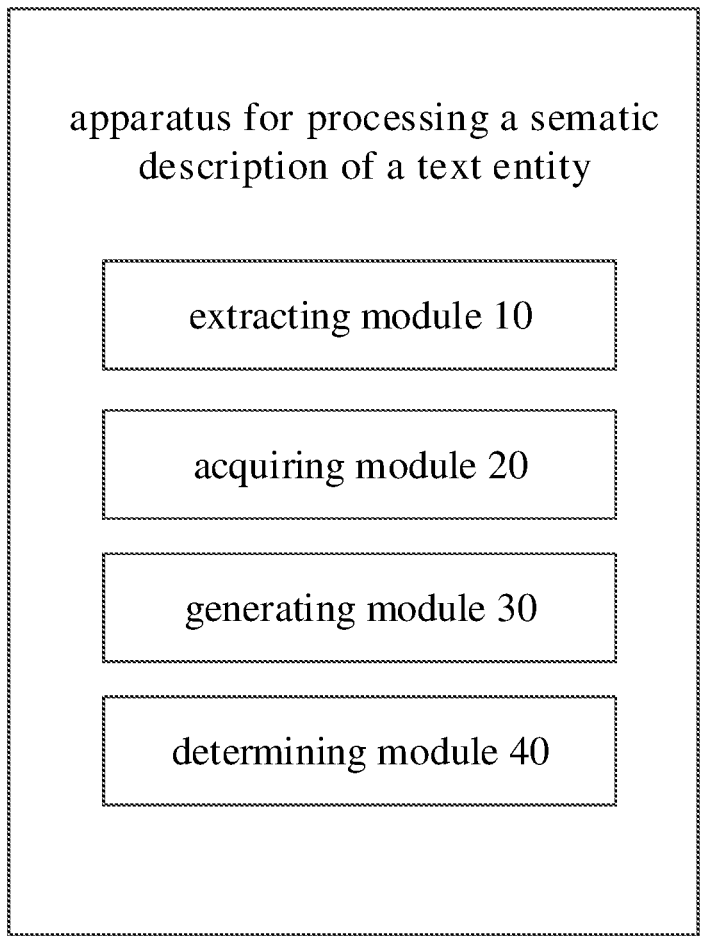
FIG. 5 is a block diagram of an apparatus for processing a sematic description of a text entity according to an embodiment of the present disclosure.

FIG. 5 is a block diagram of an apparatus for processing a sematic description of a text entity according to an embodiment of the present disclosure. As shown in FIG. 5, the apparatus includes: an extracting module 10, an acquiring module 20, a generating module 30, and a determining module 40.

The extracting module 10 is configured to acquire a plurality of target texts containing a main entity, and extract related entities describing the main entity from each target text.

The acquiring module 20 is configured to acquire a sub-relation vector of a pair of the main entity and each related entity in each target text.

The generating module 30 is configured to calculate a similarity distance of the main entity between different target texts based on the sub-relation vector.

The determining module 40 is configured to determine a semantic similarity of the main entity descripted in different target texts based on the similarity distance.

In an embodiment of the present disclosure, the extracting module 10 is configured to: recognize named entities in each target text to acquire a candidate entity set; acquire candidate entities whose distance from the main entity in the target text is less than a preset distance from the candidate entity set, and determine the candidate entities as the related entities describing the main entity.

In an embodiment of the present disclosure, the acquiring module 20 is specifically configured to: acquire a first vector representation of each word in the target text; weight the first vector representation, the main entity, and each related entity based on a pre-trained conversion model, and acquire a second vector representation of a text content associated with the main entity and each related entity in the target text; and perform a pooling process on the second vector representation to generate the sub-relation vector of the pair of the main entity and each related entity.

In an embodiment of the present disclosure, the acquiring module 20 is specifically configured to: process the target text, the main entity and each related entity based on a pre-trained relation extraction model, and acquire a probability distribution of a relation between the main entity and each related entity; and perform a mapping on the probability distribution based on a pre-trained mapping model, and acquiring the sub-relation vector of the pair of the main entity and each related entity.

In an embodiment of the present disclosure, the generating module 30 is specifically configured to: perform a summation on the sub-relation vector of the pair of the main entity and each related entity pair in each target text, and calculate a main relation vector corresponding to the main entity in each target text; and calculate the similarity distance of the main entity between different target texts based on the main relation vector.

It should be noted that the explanation of the method in the foregoing embodiment is also applicable to the apparatus of this embodiment, which will not be described herein.

According to the apparatus of the present disclosure, the solution includes acquiring a plurality of target texts containing a main entity, and extracting related entities describing the main entity from each target text; acquiring a sub-relation vector of a pair of the main entity and each related entity in each target text; calculating a similarity distance of the main entity between different target texts based on the sub-relation vector; and determining a semantic similarity of the main entity descripted in different target texts based on the similarity distance. Therefore, by determining the semantic similarity of entity descriptions in different texts, it is possible to compare the description information related to specific entities in different texts, while ignoring other irrelevant entities, so as to accurately determine whether the descriptions of the same entity in different texts are similar. It can be applied to scenarios such as multi-article verification of intelligent question answering and encyclopedia entry classification.

In order to implement the above-mentioned embodiments, the present disclosure also proposes a computer program product, in which when instructions in the computer program product are executed by a processor, the processor is caused to implement the method as described in any of the foregoing embodiments.

According to the embodiments of the present disclosure, the present disclosure also provides an electronic device and a readable storage medium.

Figure 6:
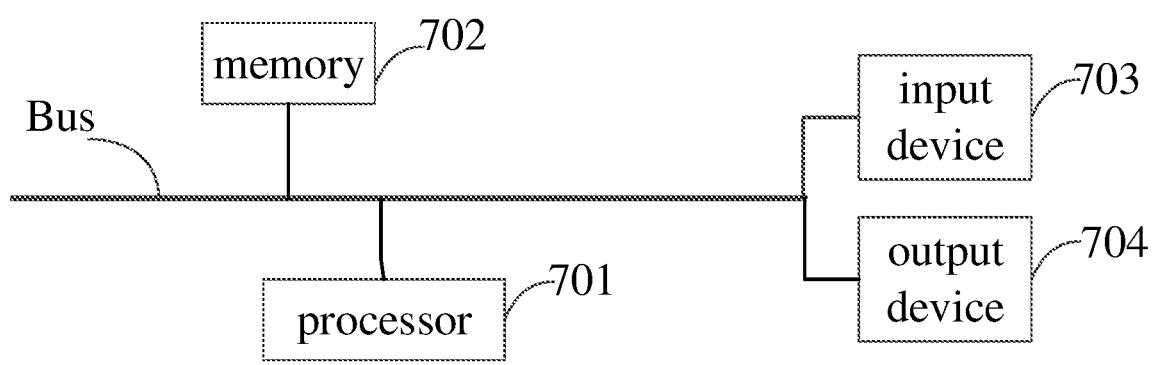
FIG. 6 is a block diagram of an electronic device for implementing embodiments of the present disclosure.

As shown in FIG. 6, FIG. 6 is a block diagram of an electronic device for implementing embodiments of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 6, the electronic device includes: one or more processors 601, a memory 602, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 601 is taken as an example in FIG. 6.

The memory 602 is a non-transitory computer-readable storage medium according to the present disclosure. The memory stores instructions executable by at least one processor, so that the at least one processor executes the method for processing a sematic description of a text entity according to the present disclosure. The non-transitory computer-readable storage medium of the present disclosure stores computer instructions, which are used to cause a computer to execute the method for processing a sematic description of a text entity according to the present disclosure.

As a non-transitory computer-readable storage medium, the memory 602 is configured to store non-transitory software programs, non-transitory computer executable programs and modules, such as program instructions/modules corresponding to the voice skill creation method in the embodiment of the present disclosure (For example, the extracting module 10, the acquiring module 20, the generating module 30, and the determining module 40 shown in FIG. 5). The processor 601 executes various functional applications and data processing of the server by running non-transitory software programs, instructions, and modules stored in the memory 602, that is, implementing the method for processing a sematic description of a text entity in the foregoing method embodiment.

The memory 602 may include a storage program area and a storage data area, where the storage program area may store an operating system and application programs required for at least one function. The storage data area may store data created according to the use of the electronic device, and the like. In addition, the memory 602 may include a high-speed random access memory, and a non-transitory memory, such as at least one magnetic disk storage device, a flash memory device, or other non-transitory solid-state storage device. In some embodiments, the memory 602 may optionally include a memory remotely disposed with respect to the processor 601, and these remote memories may be connected to the electronic device through a network. Examples of the above network include, but are not limited to, the Internet, an intranet, a local area network, a mobile communication network, and combinations thereof.

The electronic device for implementing the method for processing a sematic description of a text entity may further include: an input device 603 and an output device 604. The processor 601, the memory 602, the input device 603, and the output device 604 may be connected through a bus or in other manners. In FIG. 6, the connection through the bus is taken as an example.

The input device 603 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device 604 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

The solution includes acquiring a plurality of target texts containing a main entity, and extracting related entities describing the main entity from each target text; acquiring a sub-relation vector of a pair of the main entity and each related entity in each target text; calculating a similarity distance of the main entity between different target texts based on the sub-relation vector; and determining a semantic similarity of the main entity descripted in different target texts based on the similarity distance. Therefore, by determining the semantic similarity of entity descriptions in different texts, it is possible to compare the description information related to specific entities in different texts, while ignoring other irrelevant entities, so as to accurately determine whether the descriptions of the same entity in different texts are similar. It can be applied to scenarios such as multi-article verification of intelligent question answering and encyclopedia entry classification.

It should be understood that various forms of processes shown above may be used to reorder, add, or delete steps. For example, the steps described in the present disclosure may be performed in parallel, sequentially, or in different orders. As long as the desired results of the technical solutions disclosed in the present disclosure can be achieved, no limitation is made herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for processing a sematic description of a text entity, comprising:
   acquiring a plurality of target texts containing a main entity, and extracting related entities describing the main entity from each target text;
   acquiring a sub-relation vector of a pair of the main entity and each related entity in each target text;
   calculating a similarity distance of the main entity between different target texts based on the sub-relation vector; and
   determining a semantic similarity of the main entity descripted in different target texts based on the similarity distance,
   wherein the acquiring the sub-relation vector of the pair of the main entity and each related entity in each target text comprises:
   acquiring a first vector representation of each word in the target text;
   weighting the first vector representation, the main entity, and each related entity based on a pre-trained conversion model, and acquiring a second vector representation of a text content associated with the main entity and each related entity in the target text; and
   performing a pooling process on the second vector representation to generate the sub-relation vector of the pair of the main entity and each related entity.

2. The method of claim 1, wherein the extracting the related entities describing the main entity from each target text comprises:
   recognizing named entities in each target text to acquire a candidate entity set; and
   acquiring candidate entities whose distance from the main entity in the target text is less than a preset distance from the candidate entity set, and determining the candidate entities as the related entities describing the main entity.

3. The method of claim 1, wherein the acquiring the sub-relation vector of the pair of the main entity and each related entity in each target text comprises:
   processing the target text, the main entity and each related entity based on a pre-trained relation extraction model, and acquiring a probability distribution of a relation between the main entity and each related entity; and
   performing a mapping on the probability distribution based on a pre-trained mapping model, and acquiring the sub-relation vector of the pair of the main entity and each related entity.

4. The method of claim 1, wherein the calculating the similarity distance of the main entity between different target texts based on the sub-relation vector comprises:
   performing a summation on the sub-relation vector of the pair of the main entity and each related entity pair in each target text, and calculating a main relation vector corresponding to the main entity in each target text; and
   calculating the similarity distance of the main entity between different target texts based on the main relation vector.

5. An apparatus for processing a sematic description of a text entity, comprising:
   a non-transitory computer-readable medium including computer-executable instructions stored thereon, and an instruction execution system which is configured by the instructions to implement:

an extracting module, configured to acquire a plurality of target texts containing a main entity, and extract related entities describing the main entity from each target text;

an acquiring module, configured to acquire a sub-relation vector of a pair of the main entity and each related entity in each target text;

a generating module, configured to calculate a similarity distance of the main entity between different target texts based on the sub-relation vector; and a determining module, configured to determine a semantic similarity of the main entity described in different target texts based on the similarity distance, wherein the acquiring module is configured to:

acquire a first vector representation of each word in the target text;

weight the first vector representation, the main entity, and each related entity based on a pre-trained conversion model, and acquire a second vector representation of a text content associated with the main entity and each related entity in the target text; and perform a pooling process on the second vector representation to generate the sub-relation vector of the pair of the main entity and each related entity.

6. The apparatus of claim 5, wherein the extracting module is configured to:

recognize named entities in each target text to acquire a candidate entity set; and acquire candidate entities whose distance from the main entity in the target text is less than a preset distance from the candidate entity set, and determine the candidate entities as the related entities describing the main entity.

7. The apparatus of claim 5, wherein the acquiring module is configured to:

process the target text, the main entity and each related entity based on a pre-trained relation extraction model, and acquire a probability distribution of a relation between the main entity and each related entity; and perform a mapping on the probability distribution based on a pre-trained mapping model, and acquire the sub-relation vector of the pair of the main entity and each related entity.

8. The apparatus of claim 5, wherein the generating module is configured to:

perform a summation on the sub-relation vector of the pair of the main entity and each related entity pair in each target text, and calculate a main relation vector corresponding to the main entity in each target text; and calculate the similarity distance of the main entity between different target texts based on the main relation vector.

9. A non-transitory computer-readable storage medium storing computer instructions, wherein when the computer instructions are executed, a computer is caused to implement a method for processing a sematic description of a text entity, the method comprising:

acquiring a plurality of target texts containing a main entity, and extracting related entities describing the main entity from each target text;

acquiring a sub-relation vector of a pair of the main entity and each related entity in each target text;

calculating a similarity distance of the main entity between different target texts based on the sub-relation vector; and determining a semantic similarity of the main entity descripted in different target texts based on the similarity distance, wherein the acquiring the sub-relation vector of the pair of the main entity and each related entity in each target text comprises:

acquiring a first vector representation of each word in the target text;

weighting the first vector representation, the main entity, and each related entity based on a pre-trained conversion model, and acquiring a second vector representation of a text content associated with the main entity and each related entity in the target text; and performing a pooling process on the second vector representation to generate the sub-relation vector of the pair of the main entity and each related entity.

* * * * *